(12) United States Patent
Tsumura et al.

(10) Patent No.: US 6,316,043 B1
(45) Date of Patent: Nov. 13, 2001

(54) PROCESS FOR PRODUCING SOY MILK

(75) Inventors: Haruo Tsumura; Takashi Nishimura, both of Izumisano (JP)

(73) Assignee: Fuji Oil Co., Ltd., Osaka-Fu (JP)

(*) Notice: Subject to any disclaimer, the term of this patent is extended or adjusted under 35 U.S.C. 154(b) by 0 days.

(21) Appl. No.: 09/529,315

(22) PCT Filed: Aug. 3, 1999

(86) PCT No.: PCT/JP99/04160

§ 371 Date: Apr. 12, 2000

§ 102(e) Date: Apr. 12, 2000

(87) PCT Pub. No.: WO00/08943

PCT Pub. Date: Feb. 24, 2000

(30) Foreign Application Priority Data

Aug. 12, 1998 (JP) .................................................. 10-227850

(51) Int. Cl.[7] ....................................................... A23L 1/20
(52) U.S. Cl. .......................... 426/634; 426/573; 426/598
(58) Field of Search .................................. 426/634, 598, 426/573

(56) References Cited

U.S. PATENT DOCUMENTS

| 4,054,679 | 10/1977 | Melcer et al. . |
|---|---|---|
| 4,636,398 | 1/1987 | Matsuura . |
| 4,664,930 | * 5/1987 | Moriya . |
| 4,678,677 | * 7/1987 | Sugisawa et al. . |
| 4,789,556 | * 12/1988 | Okonogi et al. . |
| 4,791,001 | 12/1988 | Matsuura et al. . |
| 5,863,590 | * 1/1999 | Alan et al. . |

FOREIGN PATENT DOCUMENTS

| 42-27294 | 12/1967 | (JP) . |
|---|---|---|
| 46-6817 | 2/1971 | (JP) . |
| 57-189657 | 11/1982 | (JP) . |
| 59-55144 | 3/1984 | (JP) . |
| 5-308900 | 11/1993 | (JP) . |

* cited by examiner

*Primary Examiner*—Anthony J. Weier
(74) *Attorney, Agent, or Firm*—Wenderoth, Lind & Ponack, L.L.P.

(57) ABSTRACT

A process for producing a soy milk which involves adding a solidifying agent to a soy milk employed as the starting material, homogenizing the mixture, directly heating instantaneously with steam and then homogenizing again. The thus obtained soy milk has a body taste and is in the form of a liquid with a low viscosity. When heated, it is never solidified again. Therefore, this soy milk is appropriately usable in additives for pastry or bread doughs, fillings such as creams, materials for fermented food products, materials for drinks, materials for ice creams, materials for desserts, materials for fish paste products, materials for prepared foods, etc.

25 Claims, No Drawings

PROCESS FOR PRODUCING SOY MILK

TECHNICAL FIELD

The present invention relates to a method of producing a soymilk with an improved flavor.

BACKGROUND ART

Recently, intention to improve and preserve health with the aid of foods has increased and significance of vegetable foods has been increasingly recognized, resulting in expectation of a soymilk to serve as such a vegetable food. In response to the expectation, improved techniques for producing a soymilk have been developed independently of methods of producing a tofu (bean curd). As a result, soymilks in which bean smell, raw smell, bitter taste and astringent taste have been suppressed so as to be easy to drink have become commercially available. The wide variety of the improved techniques include removal of seed coats and hypocotyls, heating for inactivation of enzymes, treatment upon crushing and grinding, treatment upon separating tofu refuse, steps of sterilization and deodorization.

Such improved soymilks are remarkably easy to drink as compared to conventional soymilks. However, they still remain to be improved if they are used as materials for drinks or desserts although the bean smell, raw smell, bitter taste and astringent taste characteristic of soybeans have been improved to some extent.

In order to overcome the problems concerning the flavor of soymilks, they were conventionally seasoned with sweeteners, various flavors, fruit juices etc. for masking bean smell, raw smell, bitter taste and astringent taste characteristic of soybeans. However, such treatments are still insufficient. In addition, the flavors are unnatural. No method has been developed for producing a soymilk which can be utilized as a kneading material for confectionery or bakery and a filling material such as cream, as well as materials for fermentation foods, drinks, ice creams, desserts, aquatic or live-stock paste products, cooked daily dish and the like while retaining the natural flavor of soybeans The present inventors directed their attention to the excellent flavor of a tofu prepared from a soymilk by a traditional method. Then, the present inventors began to examine a method of producing a liquid tofu with a tofu flavor, i.e., a soymilk which has low viscosity, does not re-coagulate, and can be utilized as a kneading material for confectionery or bakery and a filling material such as cream, as well as materials for fermentation foods, drinks, ice creams, desserts, aquatic or live-stock paste products, cooked daily dish and the like. In the course of the examination, it revealed that various methods for enriching soymilks with calcium have been examined, which provide similar effects, although the methods were developed for different purposes than those of the present inventors. Specifically, various methods have been proposed as follows for overcoming problems of increased viscosity due to aggregation of calcium with proteins in a soymilk or of coagulation into tofu-like state upon addition of the calcium into the soymilk.

For example, JP-A 52-90662 and JP-A 53-96356 disclose a method comprising adjusting pH by adding calcium hydroxide, a fat and an emulsifying agent to a soymilk. JP-A 53-183669 discloses a method comprising adding a chelating agent. JP-A 54-95771 discloses a method comprising adding casein and/or dephosphorylated β-casein to an aqueous solution of soybean protein followed by addition of a calcium salt solution. JP-A 59-6839 discloses a method comprising partially hydrolyzing separated proteins, adding a fat and calcium glycerophosphate, and homogenizing the mixture. JP-A 59-173044 discloses a method comprising adding calcium lactate and sodium hydrogencarbonate in combination to a soymilk. JP-A 60-47636 discloses a method comprising incorporating a calcium compound into a soymilk in the presence of glycerol or propylene glycol. JP-A 61-25458 discloses a method comprising adding saccharide lime to a soymilk or a soybean protein drink and neutralizing the mixture with an organic acid. JP-A 61-249355 discloses a method comprising contacting a soymilk with a calcium-type strong acid cation-exchange membrane. JP-A 5-308900 discloses a method comprising adding calcium to a solution of separated soybean proteins and various soymilks, coagulating proteins, homogenizing the mixture, adding an acidulant, and homogenizing and heat-sterilizing the mixture.

However, none of the above-mentioned methods teaches a method comprising adding a coagulant for soybean proteins, then sterilizing the mixture with direct high-temperature flash heating using steam and homogenizing it.

OBJECTS OF INVENTION

As described above, conventional methods in which a coagulant is added to a soymilk had problems, including unavoidableness of influence on the flavor of the soymilk due to the coagulant itself, agents used in combination, or change in pH, as well as complexity of operation.

SUMMARY OF INVENTION

The present inventors directed their attention to the excellent flavor of a tofu produced from a soymilk by a traditional method. Then, it was found that a liquid tofu having a tofu flavor, in other words, a soymilk which has low viscosity, does not re-coagulate, and can be utilized as a kneading material for confectionery or bakery and a filling material such as cream, as well as materials for fermentation foods, drinks, ice creams, desserts, aquatic or live-stock paste products, cooked daily dish and the like has an excellent flavor. Furthermore, it was found that a soymilk could be converted into a fine colloidal solution by homogenizing a tofu-like coagulation formed by heating a soymilk and adding a coagulant thereto. This procedure reduces raw smell, bitter taste and astringent taste inherently associated with a soymilk and makes the soymilk have a flavor as good as a tofu. In addition, it was found that a soymilk, which has a better flavor, has remarkably low viscosity and does not re-coagulate upon subsequent heating, can be obtained by treating the fine colloidal solution derived from the soymilk with direct high-temperature flash heating using steam and then homogenizing it. The present inventors completed the present invention based on such new findings.

The present invention provides a method of producing a soymilk, comprising adding a coagulant to a raw soymilk, homogenizing, treating with direct high-temperature flash heating using steam, and then homogenizing the mixture. The pH of the raw soymilk is preferably adjusted to 7–8. One or more selected from the group consisting of a bittern, a magnesium salt, a calcium salt and glucono-δ-lactone can be used as the coagulant. Preferably, the amount of the added coagulant is 2–8% (in the case of magnesium salt or calcium salt, 0.24–1.9% as magnesium or calcium) based on the crude protein content of the soymilk. The direct high-temperature flash heating is preferably conducted at 120–150° C. for 2–10 seconds. The homogenization is conducted using a homogenizer preferably at a pressure of, without limitation, 5–200 kg/cm². The appropriate pH of the produced soymilk is 5.5–7.4, preferably 6.5–7.4.

DETAILED DESCRIPTION OF THE INVENTION

A soymilk made from soybeans is suitably used in the present invention. Soybeans from which seed coats and hypocotyls are removed and which are heated for inactivating enzymes are preferred. A raw soymilk can be obtained by known methods. The pH of the obtained raw soymilk is preferably adjusted to 7–8 in order to deal with the lowering of the pH caused by addition of a coagulant. Use of a raw soymilk at pH within the range as described above results in a soymilk at pH 5.5–7.4.

A coagulant used in the present invention includes one selected from the group consisting of a magnesium salt such as a natural (salt pan) bittern, magnesium chloride or magnesium sulfate, a calcium salt such as calcium sulfate, calcium chloride, calcium lactate or whey calcium, as well as glucono-δ-lactone or a mixture thereof. Either of the above-mentioned coagulants can be effectively used to reduce raw smell, bitter taste and astringent taste of a soymilk. The bittern and the magnesium salt are more effective in providing a soymilk with good body such as milk taste than the calcium salt. The effect of improving the flavor achieved by using glucono-δ-lactone alone is less than that achieved by using the magnesium salt or the calcium salt. Therefore, it is preferred to use glucono-δ-lactone in combination with the magnesium salt or the calcium salt. In addition, an organic acid such as fumaric acid can be used in place of glucono-δ-lactone.

The amount of the coagulant added in the present invention varies depending on the coagulant used. The suitable amount is usually, as a salt, 1–4% based on the solid content of the soymilk, or 2–8% (in the case of a magnesium salt or a calcium salt, 0.24–1.9% as magnesium or calcium) based on the crude protein content of the soymilk. If the amount of the coagulant is less than 2% based on the crude protein content of the soymilk, effect of reducing raw smell, bitter taste and astringent taste of a soymilk cannot be observed. On the other hand, if the amount is over 8%, the taste of the coagulant is recognized as a tang, the pH lowers, and the flavor is impaired. Furthermore, such a high amount makes the subsequent homogenization difficult to conduct because of the excessive coagulation of the soymilk. In view of improvement of the flavor, the amount of the coagulant is preferably 3–7% (in the case of magnesium salt or calcium salt, 0.36–1.6% as magnesium or calcium) based on the crude protein content of the soymilk.

There is no limitation regarding the time at which the coagulant is added as long as it is added prior to direct high-temperature flash heating using steam. For example, in a case where pre-heating is conducted prior to the homogenization as described below, the coagulant may be added before or after the pre-heating. If the coagulant is added in an amount which makes the soymilk coagulate like a tofu, it is possible to facilitate the homogenization by continuously stirring the soymilk from the time of addition to the time of homogenization such that the soymilk does not separate into aggregates and a supernatant.

Homogenization is not necessarily required if the soymilk to which a coagulant is added is composed of coagulations which can be processed subsequently in the device for direct high-temperature flash heating using steam. However, a soymilk with a coagulant added is usually homogenized because the treatment with high-temperature flash heating enhances the effect of improving the flavor of the soymilk. Homogenizing means such as a known homogenizer can be utilized for the homogenization. The homogenization can make the subsequent direct high-temperature flash heating using steam effective. The homogenization prior to the high-temperature flash heating is conducted using a high-pressure homogenizer and the like suitably at a pressure of, for example, 5–200 kg/cm².

Pre-heating may be conducted prior to the homogenization in order to increase the reactivity of the coagulant. When a tofu is produced, a soymilk is usually heated to 70° C. or above before and/or after adding a coagulant in order to increase the reactivity of the coagulant. In contrast, it is not necessarily required that a soymilk is coagulated at the time of homogenization in the present invention. Thus, the soymilk with the coagulant added does not need to be heated. Rather, a soymilk with a more excellent flavor can be obtained by promoting the reaction of the soymilk with the coagulant in the subsequent direct high-temperature flash heating.

The homogenized soymilk is treated with direct high-temperature flash heating using steam. As used herein, a treatment with direct high-temperature flash heating refers to a treatment in which steam is directly blown into a soymilk to elevate the temperature of the soymilk in a moment. This treatment denatures proteins and the like in the soymilk and improves the flavor of the soymilk remarkably.

There is no limitation regarding the temperature of the soymilk before the high-temperature flash heating. By pre-heating, increase in water content due to the blow of steam can be reduced, thereby preventing the solid content of the resulting soymilk from reducing. A pre-heating temperature of, without limitation, 60° C. or above is sufficiently used. A temperature of 70° C. or above, at which the reaction of the soymilk with the coagulant is promoted, is not necessarily required.

The high-temperature flash heating of the present invention is direct high-temperature flash heating using steam. It is considered that such heating contributes to the prevention of re-aggregation upon re-heating and the improvement of the flavor as a result of the following. At the injection portion for steam, an aggregated soymilk is mixed with steam, resulting in further denaturation of aggregated proteins due to the high temperature and the high pressure. Then, the soymilk becomes less viscous and the aggregated proteins are converted into fine particles. Furthermore, the reduced pressure in a flash pan provides a deodorizing effect.

The direct high-temperature flash heating may be usually conducted at 120–150° C. or below for one second to one minute, preferably for 2–10 seconds.

The direct high-temperature flash heating using steam remarkably reduces the viscosity of the soymilk aggregated by adding the coagulant. The viscosity can be further reduced by the subsequent homogenization.

The homogenization following the high-temperature flash heating can also be conducted utilizing known homogenizing means such as a high-pressure homogenizer and the like as in the case of the above-mentioned homogenization preferably at a pressure of, without limitation, 5–200 kg/cm².

The soymilk of the present invention produced by the method as described above has reduced raw smell, bitter taste and astringent taste associated with a raw soymilk, has good body such as milk taste as well as a good flavor, has low viscosity, and does not re-coagulate upon heating in liquid state. The pH of the soymilk is suitably 5.5–7.4, preferably 6.5–7.4.

The following Examples further illustrate the present invention in detail but are not to be construed to limit the scope of thereof. In the Examples, "part" and "%" are by weight unless otherwise stated.

EXAMPLE 1

Ten parts of water were added to one part of soybeans from which seed coats and hypocotyls had been removed, then the soybeans were soaked at 30–50° C. for 60 minutes or longer. Three parts of hot water (90° C.) were added to one part of the soybeans with removed seed coats and hypocotyls which had absorbed with plenty of water (water content of 40–55%), then the mixture was processed using a grinder (Masukou Sangyou). A sodium bicarbonate solution was added to the mixture to adjust the pH to 7.4–8.0. The mixture was supplied into a homogenizer (APV) to homogenize at a pressure of 170 kg/cm$^2$. The ground and homogenized mixture was centrifuged at 3000G for five minutes to obtain a soymilk and a tofu refuse. The soymilk was used as a raw soymilk. The raw soymilk contained 9.0% of solid and 4.5% of protein, and had pH of 7.5.

In order to examine the effects of the coagulants on the flavors, a salt pan bittern (Akou Kasei, magnesium chloride hexahydrate, purity of 92%), magnesium chloride (Kishida Kagaku, for food additive, purity of 95%) or calcium sulfate dihydrate (Kishida Kagaku, for food additive, purity of 98%) was added to the raw soymilk to assess the flavors. After the raw soymilk was heated to 80° C., the coagulant dissolved or dispersed in water was added thereto and mixed. The mixture was homogenized using a homogenizer at a pressure of 100 kg/cm$^2$, sterilized with direct high-temperature flash heating using steam (142° C. for four seconds), homogenized using a homogenizer at a pressure of 100 kg/cm$^2$, and then assessed.

The addition of the coagulant masked the raw smell, the bitter taste and the astringent taste of the soymilk from the flavor, and added good body. When the concentration of the added coagulant was 2.0% based on the solid content of the raw soymilk (approximately 4% based on the crude protein content of the soymilk), milk taste was recognized. When the concentration of the added coagulant was 3.5% based on the solid content (approximately 7% based on the crude protein content of the soymilk), the flavor was similar to a tofu and the astringent taste of the coagulant was slightly recognized. However, when the concentration of the added coagulant was less than 1.0% based on the solid content of the raw soymilk (approximately 2% based on the crude protein content of the soymilk), the masking effect was little. When the concentration was over 4.0% based on the solid content (approximately 8% based on the crude protein content of the soymilk), the taste of the coagulant was recognized as a tang, and the effect of improvement the flavor was not observed.

Furthermore, when the concentration of the added coagulant was 2.0% based on the solid content of the raw soymilk (approximately 4% based on the crude protein content of the soymilk), both the viscosity and the particle diameter were almost the same as those of a soymilk without a coagulant added even before the sterilization. However, when the concentration of the added coagulant was 3.5% based on the solid content of the soymilk (approximately 7% based on the crude protein content of the soymilk) or more, re-heating (70° C.) without sterilizing and homogenizing the soymilk resulted in re-aggregation, even if it was liquefied by homogenizing using a homogenizer at a pressure of 100 kg/cm$^2$.

The viscosity and the particle diameter were reduced by adding a coagulant to a soymilk, heat-aggregating and sterilizing the soymilk. When the concentration of the coagulant added was changed from 2.0% to 3.5% based on the solid content of the raw soymilk, no significant difference in viscosity was observed after sterilization and homogenization. Furthermore, neither aggregation nor water-separation was observed for the both soymilks with added coagulant of 2.0% and 3.5% based on the solid content of the raw soymilk upon re-heating (85° C. for 5 minutes) although increase in viscosity was observed. Addition of a bittern and magnesium chloride as coagulants resulted in a good final flavor, whereas addition of calcium sulfate resulted in slightly inferior body.

The results are summarized in Tables 1, 2 and 3.

Viscosity was measured using a B-type viscometer (BM type) at 10° C. Particle diameter was measured using a laser diffraction-type particle size distribution-measuring instrument LA500 (Horiba Seisakusho).

TABLE 1

Physical properties and flavors of samples after homogenization and before sterilization.

|  | pH (15° C.) | Viscosity (cps) | Particle diameter (μm) | Flavor |
|---|---|---|---|---|
| No addition | 7.50 | 11 | 0.98 |  |
| Bittern |  |  |  |  |
| 0.8% | 7.30 | 11 | 1.00 | Δ Indistinguishable from no addition |
| 2.0% | 7.03 | 12 | 1.07 | ⊚ Good body, milk taste feeling |
| 3.5% | 6.90 | 270 | 9.49 | ○ Tofu-like, thick |
| MgCl$_2$ |  |  |  |  |
| 0.8% | 7.34 | 11 | 1.00 | Δ Indistinguishable from no addition |
| 2.0% | 6.97 | 13 | 1.10 | ⊚ Good body, milk taste feeling |
| 3.5% | 6.87 | 315 | 10.21 | ○ Tofu-like, thick |
| CaSO$_4$ |  |  |  |  |
| 0.8% | 7.30 | 11 | 1.00 | Δ Indistinguishable from no addition |
| 2.0% | 6.88 | 14 | 2.13 | ○ Good body, slight astringent taste |
| 3.5% | 6.77 | 1740 | 14.98 | ○ Tofu-like, slight astringent taste |

TABLE 2

Physical properties and flavors of samples after sterilization.

|  | pH (15° C.) | Viscosity (cps) | Particle diameter (μm) | Flavor |
|---|---|---|---|---|
| No addition | 7.50 | 11 | 0.91 |  |
| Bittern |  |  |  |  |
| 0.8% | 7.30 | 11 | 0.92 | Δ Indistinguishable from no addition |
| 2.0% | 7.03 | 12 | 0.94 | ⊚ Good body, milk taste feeling |
| 3.5% | 6.90 | 18 | 4.42 | ○ Tofu-like, thick |

TABLE 2-continued

Physical properties and flavors of samples after sterilization.

| | pH (15° C.) | Viscosity (cps) | Particle diameter (μm) | Flavor |
|---|---|---|---|---|
| MgCl₂ | | | | |
| 0.8% | 7.34 | 11 | 0.94 | Δ Indistinguishable from no addition |
| 2.0% | 6.97 | 12 | 0.96 | ☉ Good body, milk taste feeling |
| 3.5% | 6.87 | 19 | 4.56 | ○ Tofu-like, thick |
| CaSO₄ | | | | |
| 0.8% | 7.30 | 11 | 1.00 | Δ Indistinguishable from no addition |
| 2.0% | 6.88 | 11 | 2.13 | ○ Good body, slight astringent taste |
| 3.5% | 6.77 | 25 | 5.98 | ○ Tofu-like, slight astringent taste |

TABLE 3

Physical properties and flavors of samples after sterilization and homogenization.

| | pH (15° C.) | Viscosity (cps) | Particle diameter (μm) | Flavor |
|---|---|---|---|---|
| No addition Bittern | 7.50 | 10 | 0.84 | |
| 0.8% | 7.30 | 10 | 0.82 | Δ Indistinguishable from no addition |
| 2.0% | 7.03 | 10 | 0.81 | ☉ Good body, milk taste feeling |
| 3.5% | 6.90 | 12 | 3.21 | ○ Tofu-like, thick |
| MgCl₂ | | | | |
| 0.8% | 7.34 | 11 | 0.82 | Δ Indistinguishable from no addition |
| 2.0% | 6.97 | 11 | 0.85 | ☉ Good body, milk taste feeling |
| 3.5% | 6.87 | 12 | 3.51 | ○ Tofu-like, thick |
| CaSO₄ | | | | |
| 0.8% | 7.30 | 11 | 0.87 | Δ Indistinguishable from no addition |
| 2.0% | 6.88 | 11 | 1.23 | ○ Good body, slight astringent taste |
| 3.5% | 6.77 | 16 | 3.54 | ○ Tofu-like, slight astringent taste |

EXAMPLE 2

Effects of heating conditions of direct high-temperature flash heating using steam on viscosity, particle diameter and aggregation after re-heating (85° C. for five minutes) were examined.

After a soymilk obtained as described in Example 1 was heated to 80° C., magnesium chloride hexahydrate (Kishida Kagaku, for food additive, purity of 95%) dissolved in water was added thereto to a concentration of 2.0% or 3.5% based on the solid content of the soymilk (approximately 4% or approximately 7% based on the crude protein content of the soymilk, respectively) and mixed. The mixture was homogenized using a homogenizer at a pressure of 100 kg/cm². The homogenized mixture was sterilized with direct high-temperature flash heating using steam at 142° C. for two or four seconds, homogenized using a homogenizer at a pressure of 100 kg/cm², and then assessed. When the concentration of the added coagulant was 2.0% based on the solid content of the soymilk, there was no difference between the result obtained for the treatment time of two seconds and that of four seconds. In this case, coagulation in tofu-like state was observed before sterilization. When the concentration of the added coagulant was 3.5% based on the solid content of the soymilk, two seconds of treatment did not result in decrease in viscosity or particle diameter after the subsequent homogenization to the level observed for four seconds of treatment. The viscosity remained high, and crumbling aggregates were observed in part upon re-heating although coagulation was not observed. The viscosity and the particle diameter of the sample treated for two seconds and subjected to two rounds of homogenization decreased as compared with those subjected to one round of homogenization (data not shown in Table). However, they were higher than those obtained for the sample treated for four seconds. In addition, improvement in aggregation after re-heating was not observed. These results suggest that the sterilization time of direct high-temperature flash heating using steam greatly affects the physical properties of the final product.

The results are shown in Table 4. In Table 4, viscosity was measured using a B-type viscometer (BM type) at 10° C. Particle diameter was measured using a laser diffraction-type particle size distribution-measuring instrument LA500 (Horiba Seisakusho).

TABLE 4

Sterilization time and change in physical properties of samples.

| Added amount (%) | 2.0 | | 3.5 | |
|---|---|---|---|---|
| Treatment time (second) | 2 | 4 | 2 | 4 |
| Viscosity (cps) | 10.0 | 10.0 | 45.0 | 11.0 |
| Particle diameter (μm) | 0.84 | 0.81 | 5.53 | 3.10 |
| Re-aggregation | No | No | Yes | No |

EXAMPLE 3

Effects of heating conditions of direct high-temperature flash heating using steam on viscosity, particle diameter and aggregation after re-heating (85° C. for five minutes) were examined.

After a soymilk obtained as described in Example 1 was heated to 80° C., magnesium chloride hexahydrate (Kishida Kagaku, for food additive, 95%) dissolved in water was added thereto to a concentration of 3.5% based on the solid content of the soymilk and mixed. The mixture was homogenized using a homogenizer at a pressure of 100 kg/cm². The homogenized mixture was sterilized with direct high-temperature flash heating using steam (120° C. for six seconds) or by indirect heating using plate heating (120° C. for six seconds), homogenized using a homogenizer at a pressure of 100 kg/cm², and then assessed. The viscosity and the particle diameter achieved by indirect heating using plate heating did not decrease to the level of those achieved by direct high-temperature flash heating using steam even after the subsequent homogenization. The viscosity remained high, and crumbling aggregates were observed in part upon re-heating although coagulation was not observed. In addition, it was judged that the operation of the indirect heating using plate heating has problems, since the soymilk burned and stuck to the plate. These results suggest that the conditions of direct high-temperature flash heating using steam, such as the pressure upon steam mixing during sterilization, greatly affect the physical properties of the final product.

The results are shown in Table 5. In Table 5, viscosity was measured using a B-type viscometer (BM type) at 10° C. Particle diameter was measured using a laser diffraction-type particle size distribution-measuring instrument LA500 (Horiba Seisakusho).

TABLE 5

Mode of sterilization and heating and change in physical properties of samples.

| Mode of heating | Direct with steam | Indirect |
|---|---|---|
| Viscosity (cps) | 13.0 | 55.0 |
| Particle diameter ($\mu$m) | 3.30 | 5.97 |
| Re-aggregation | No | Yes |

EXAMPLE 4

Effects of pressure upon homogenization after sterilization on viscosity, particle diameter and aggregation after re-heating (85° C. for five minutes) were examined. After a soymilk obtained as described in Example 1 was heated to 80° C., magnesium chloride (Kishida Kagaku, for food additive) dissolved in water was added thereto to a concentration of 2.0% or 3.5% based on the solid content of the soymilk (approximately 4% or approximately 7% based on the crude protein content of the soymilk, respectively) and mixed. The mixture was homogenized using a homogenizer at a pressure of 100 kg/cm$^2$. The homogenized mixture was sterilized with direct high-temperature flash heating using steam (142° C. for four seconds), homogenized using a homogenizer at a pressure of 50 kg/cm$^2$, 100 kg/cm$^2$ or 150 kg/cm$^2$, and then assessed.

All the conditions using the pressure of 50 kg/cm$^2$, 100 kg/cm$^2$ and 150 kg/cm$^2$ resulted in decrease in viscosity and particle diameter and no aggregation after re-heating was observed.

The results are shown in Table 6. In Table 6, viscosity was measured using a B-type viscometer (BM type) at 10° C. Particle diameter was measured using a laser 10 diffraction-type particle size distribution-measuring instrument LA500 (Horiba Seisakusho).

TABLE 6

Change in physical properties of samples due to conditions of homogenization after sterilization.

Amount of magnesium chloride added: 2.0%

| Pressure (kg/cm$^2$) | 0 | 50 | 100 | 150 |
|---|---|---|---|---|
| Viscosity (cps) | 13 | 9.5 | 10.0 | 9.0 |
| Particle diameter ($\mu$m) | 0.94 | 0.82 | 0.81 | 0.76 |
| Re-aggregation | No | No | No | No |

Amount of magnesium chloride added: 3.5%

| Pressure (kg/cm$^2$) | 0 | 50 | 100 | 150 |
|---|---|---|---|---|
| Viscosity (cps) | 18 | 12.0 | 11.0 | 10.5 |
| Particle diameter ($\mu$m) | 4.42 | 3.41 | 3.30 | 2.98 |
| Re-aggregation | No | No | No | No |

EXAMPLE 5

Ice creams were prepared using a soymilk obtained by the production method of the present invention or a conventional soymilk obtained by similar procedure without adding a coagulant, and then the flavors were assessed.

Ice creams used in a comparative test were prepared as follows.

70 parts of soymilk (solid content of 9%), 14 parts of granulated sugar, 4 parts of powder starch syrup, 9 parts of vegetable oil and 3 parts of water were mixed. The mixture was heated to 80° C., homogenized using a homogenizer, cooled, and then finished using an ice-cream freezer (SIMAC).

Thus-prepared ice creams were assessed by ten members in a comparative sensory test. Nine of the ten members assessed that the ice cream prepared using the soymilk obtained by the production method of the present invention as a raw material had less bean taste, bean smell, raw smell, bitter taste and astringent taste and was more delicious than that obtained using the conventional soymilk.

EXAMPLE 6

Puddings were prepared using a soymilk obtained by the production method of the present invention or a conventional soymilk obtained by similar procedure without adding a coagulant, and then the flavors were assessed.

Puddings used in a comparative test were prepared as follows.

55 parts of soymilk (solid content of 9%), 27 parts of whole egg and 18 parts of fine white sugar were mixed, heated to 70° C., homogenized using a homogenizer, and heated in a steamer for 30 minutes for finishing.

Thus-prepared puddings were assessed by ten members in a comparative sensory test. All of the ten members assessed that the pudding prepared using the soymilk obtained by the production method of the present invention as a raw material had less bean taste, bean smell, raw smell, bitter taste and astringent taste, and was less glutinous and more delicious than that obtained with the conventional soymilk.

EXAMPLE 7

Lactic acid bacterium-fermented soymilks were prepared using a soymilk obtained by the production method of the present invention or a conventional soymilk obtained by similar procedure without adding a coagulant, and then the flavors were assessed. Lactic acid bacterium-fermented soymilks used in a comparative test were prepared as follows.

One part of culture broth of commercially available lactic acid bacteria (freeze-dried) as a starter was added to 99 parts of soymilk (solid content of 9%). Fermentation was conducted at 40° C. for seven hours. Then, the mixture was cooled to 7° C. to prepare a lactic acid bacterium-fermented soymilk. The pH of thus-obtained lactic acid bacterium-fermented soymilk was 4.3.

Thus-prepared lactic acid bacterium-fermented soymilks were assessed by ten members in a comparative sensory test. All of the ten members assessed that the lactic acid bacterium-fermented soymilk prepared using the soymilk obtained by the production method of the present invention as a raw material had less raw smell, bitter taste and astringent taste, was smoother, left a pleasant aftertaste, and was more delicious than that obtained with the conventional soymilk as a raw material.

As described above, a soymilk with a stable quality and an improved flavor in a simple manner and without impairing the flavor of the soymilk as compared with conventional methods in which a coagulant is added to a soymilk can be obtained according to the present invention. In other words, the soymilk of the present invention has good body, is in liquid state with low viscosity, and does not re-coagulate upon heating.

Therefore, the soymilk of the present invention can be utilized as a kneading material for confectionery or bakery and a filling material such as cream, as well as materials for fermentation foods, drinks, ice creams, desserts, aquatic or live-stock paste products, cooked daily dish and the like, which have an excellent flavor.

What is claimed is:

1. A method of producing a soymilk in liquid form, comprising adding a coagulant to a starting soymilk, homogenizing, treating with direct high-temperature flash heating using steam, and then homogenizing the mixture.

2. The method according to claim 1, wherein the pH of the starting soymilk is adjusted to 7–8.

3. The method according to claim 1, wherein the coagulant is one or more selected from the group consisting of a bittern, a magnesium salt, a calcium salt and glucono-δ-lactone.

4. The method according to claim 1, wherein th e amount of the added coagulant is 2–8% based on the crude protein content of the soymilk.

5. The method according to any one of claim 1, wherein the direct high-temperature flash heating is conducted at 120–150° C. for 2–10 seconds.

6. The method according to any one of claim 1, wherein the homogenization is conducted using a homogenizer at a pressure of 5–200 kg/cm$^2$.

7. The method according to any one of claim 1, wherein the pH of the produced soymilk is 5.5–7.4.

8. The method according to claim 2, wherein the coagulant is one or more selected from the group consisting of a bittern, a magnesium salt, a calcium salt and glucono-δ-lactone.

9. The method according to claim 2, wherein the amount of the added coagulant is 2–8% based on the crude protein content of the soymilk.

10. The method according to claim 3, wherein the amount of the added coagulant is 2–8% based on the crude protein content of the soymilk.

11. The method according to claim 2, wherein the direct high-temperature flash heating is conducted at 120–150° C. for 2–10 seconds.

12. The method according to claim 3, wherein the direct high-temperature flash heating is conducted at 120–150° C. for 2–10 seconds.

13. The method according to claim 4, wherein the direct high-temperature flash heating is conducted at 120–150° C. for 2–10 seconds.

14. The method according to claim 2, wherein the homogenization is conducted using a homogenizer at a pressure of 5–200 kg/cm$^2$.

15. The method according to claim 3, wherein the homogenization is conducted using a homogenizer at a pressure of 5–200 kg/cm$^2$.

16. The method according to claim 4, wherein the homogenization is conducted using a homogenizer at a pressure of 5–200 kg/cm$^2$.

17. The method according to claim 5, wherein the homogenization is conducted using a homogenizer at a pressure of 5–200 kg/cm$^2$.

18. The method according to claim 2, wherein the pH of the produced soymilk is 5.5–7.4.

19. The method according to claim 3, wherein the pH of the produced soymilk is 5.5–7.4.

20. The method according to claim 4, wherein the pH of the produced soymilk is 5.5–7.4.

21. The method according to claim 5, wherein the pH of the produced soymilk is 5.5–7.4.

22. The method according to claim 6, wherein the pH of the produced soymilk is 5.5–7.4.

23. The method according to claim 4, wherein the coagulant is a magnesium salt or a calcium salt, and is added in an amount of 0.24–1.9% as magnesium or calcium based on the crude protein content of the soymilk.

24. The method according to claim 9, wherein the coagulant is a magnesium salt or a calcium salt, and is added in an amount of 0.24–1.9% as magnesium or calcium based on the crude protein content of the soymilk.

25. The method according to claim 10, wherein the coagulant is a magnesium salt or a calcium salt, and is added in an amount of 0.24–1.9% as magnesium or calcium based on the crude protein content of the soymilk.

* * * * *